United States Patent
Sato et al.

(10) Patent No.: US 10,141,113 B2
(45) Date of Patent: Nov. 27, 2018

(54) CERAMIC ELECTRONIC COMPONENT

(71) Applicant: TDK Corporation, Minato-ku, Tokyo (JP)

(72) Inventors: Masayuki Sato, Tokyo (JP); Yosuke Konno, Nikaho (JP); Shunichi Yuri, Tokyo (JP); Takashi Morita, Tokyo (JP); Tsutomu Odashima, Tokyo (JP); Yushi Kanou, Tokyo (JP); Kenta Yamashita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/392,659

(22) Filed: Dec. 28, 2016

(65) Prior Publication Data

US 2017/0186547 A1    Jun. 29, 2017

(30) Foreign Application Priority Data

Dec. 28, 2015 (JP) .................................. 2015-257370

(51) Int. Cl.
*H01G 4/30* (2006.01)
*H01G 4/12* (2006.01)

(52) U.S. Cl.
CPC ............. *H01G 4/30* (2013.01); *H01G 4/1227* (2013.01)

(58) Field of Classification Search
CPC ............. B32B 18/00; C04B 35/62815; C04B 35/4682; H01G 4/30; H01G 4/1227; H01G 4/12; H01G 4/232
See application file for complete search history.

(56) References Cited

U.S. PATENT DOCUMENTS

| | | | | |
|---|---|---|---|---|
| 5,517,385 A | * | 5/1996 | Galvagni | H01G 4/385 361/312 |
| 6,108,191 A | * | 8/2000 | Bruchhaus | H01G 4/306 257/295 |
| 7,759,193 B2 | * | 7/2010 | Fishburn | H01L 28/91 438/253 |
| 9,064,636 B1 | * | 6/2015 | Sugita | H01G 4/1227 |
| 9,099,247 B1 | * | 8/2015 | Kitano | H01G 4/1227 |
| 9,640,323 B2 | * | 5/2017 | Sugita | H01G 4/30 |
| 2006/0001068 A1 | * | 1/2006 | Mosley | H01G 4/258 257/306 |
| 2009/0225494 A1 | * | 9/2009 | Yamazaki | B32B 18/00 361/321.4 |

FOREIGN PATENT DOCUMENTS

JP     2006-290675 A    10/2006

* cited by examiner

*Primary Examiner* — Noah S Wiese
(74) *Attorney, Agent, or Firm* — Arent Fox LLP

(57) ABSTRACT

A ceramic electronic component includes an interior part and an exterior part. The interior part includes an interior part dielectric layer and an internal electrode layer. The exterior part includes an exterior part dielectric layer. The exterior part is positioned outside the interior part along a laminating direction thereof. The interior part dielectric layer and the exterior part dielectric layer respectively contain barium titanate as a main component. $\beta-\alpha \geq 0.20$ and $\alpha/\beta \leq 0.88$ are satisfied, where $\alpha$ mol part and $\beta$ mol part are respectively an amount of a rare earth element contained in the interior and exterior part dielectric layers, provided that an amount of barium titanate contained in the interior and exterior part dielectric layers is respectively 100 mol parts in terms of $BaTiO_3$.

4 Claims, 3 Drawing Sheets

CERAMIC ELECTRONIC COMPONENT

BACKGROUND OF THE INVENTION

1. Field of the Invention

The present invention relates to a ceramic electronic component.

2. Description of the Related Art

Ceramic electronic components are widely utilized as miniature, high performance, and high reliability electronic components, and a large number thereof are used in electrical apparatuses and electronic apparatuses. In recent years, requirements for miniaturization, higher performance, and higher reliability of ceramic electronic components have been more and more severe due to the miniaturization and increasingly high performance of electrical apparatuses and electronic apparatuses.

In response to such requirements, Patent Document 1 discloses a multilayer ceramic capacitor attempting to improve its reliability such as dielectric breakdown voltage by adopting a specific relationship between a BET value of a raw material powder of barium titanate and a BET value of a raw material powder of a dielectric ceramic composition. However, a further improvement in high-temperature load lifetime is now required.

Patent Document 1: JP 2006-290675 A

SUMMARY OF THE INVENTION

The present invention has been made in view of such circumstances. It is an object of the invention to provide a ceramic electronic component that achieves an improvement in high-temperature load lifetime.

In order to achieve the above object, a ceramic electronic component according to a first present invention includes an interior part and an exterior part, wherein the interior part includes an interior part dielectric layer and an internal electrode layer, the exterior part includes an exterior part dielectric layer, the exterior part is positioned outside the interior part along a laminating direction thereof, the interior part dielectric layer and the exterior part dielectric layer respectively contain barium titanate as a main component, and $\beta - \alpha \geq 0.20$ and $\alpha/\beta \leq 0.88$ are satisfied, where $\alpha$ mol part is an amount of a rare earth element contained in the interior part dielectric layer, provided that an amount of barium titanate contained in the interior part dielectric layer is 100 mol parts in terms of $BaTiO_3$ and $\beta$ mol part is an amount of a rare earth element contained in the exterior part dielectric layer, provided that an amount of barium titanate contained in the exterior part dielectric layer is 100 mol parts in terms of $BaTiO_3$.

The ceramic electronic component according to the first present invention has the above-described features, and thus can significantly improve high-temperature load lifetime.

$\alpha \geq 1.0$ and $\beta \geq 1.7$ are preferably satisfied.

$(d1+d2)/c \geq 0.14$ is preferably satisfied, where "c" is a thickness of the interior part, and d1 and d2 are respectively a thickness of the two exterior parts.

A ceramic electronic component according to a second present invention includes an interior part, an exterior part, and a boundary surface therebetween wherein the interior part includes an interior part dielectric layer and an internal electrode layer, the exterior part includes an exterior part dielectric layer, the exterior part is positioned outside the interior part along a laminating direction thereof, the interior part dielectric layer and the exterior part dielectric layer respectively include barium titanate as a main component, an amount of a rare earth element contained in the interior part dielectric layer is 1.0 mol part or more, provided that an amount of barium titanate contained in the interior part dielectric layer is 100 mol parts in terms of $BaTiO_3$, and an area ratio occupied by segregation of the rare earth element in a boundary vicinity part is larger than an area ratio occupied by segregation of the rare earth element in an interior central part, where the boundary vicinity part is a part in the interior part including the interior part dielectric layer closest to the boundary surface, and the interior central portion is a part including the interior part dielectric layer positioned in a central part of the interior part along the laminating direction.

The ceramic electronic component according to the second present invention has the above-described features, and thus can significantly improve high-temperature load lifetime.

DESCRIPTION OF THE PREFERRED EMBODIMENTS

Figure 1:
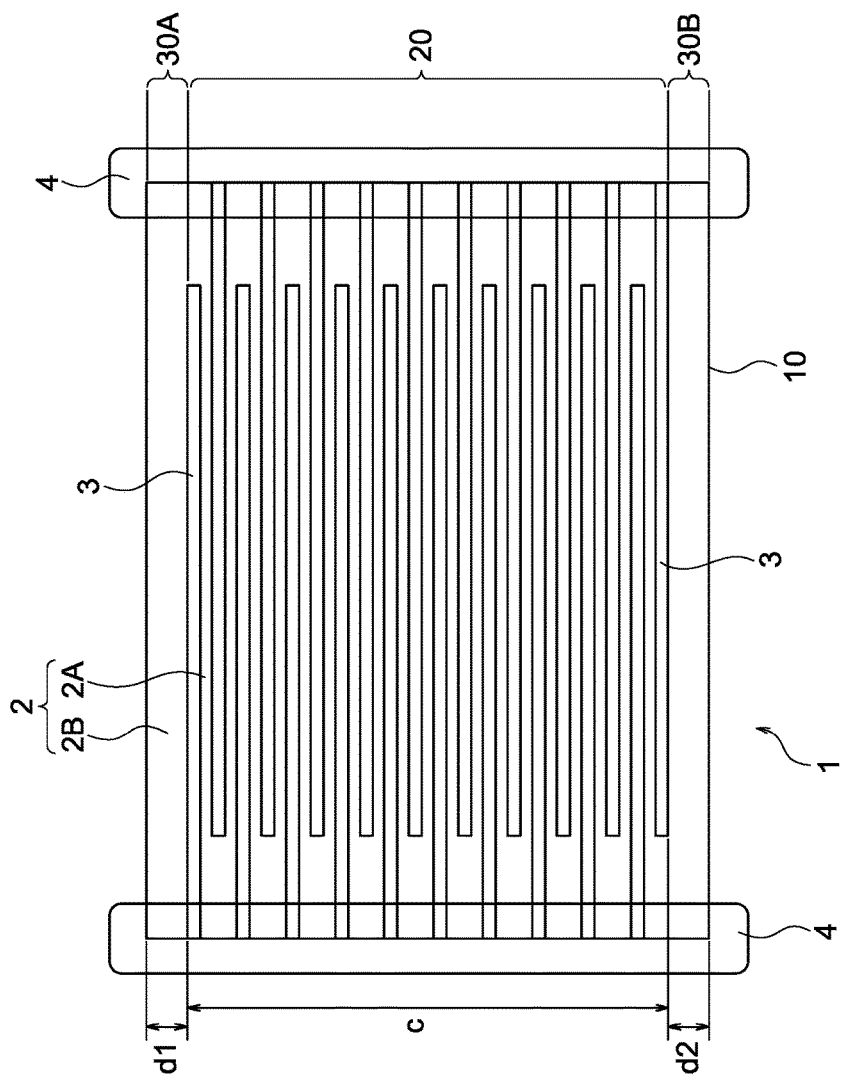
FIG. 1 is a cross-sectional view of a multilayer ceramic capacitor according to an embodiment of the present invention.

The present invention will be described below based on the embodiments shown in the drawings.

First Embodiment

A first embodiment will be described below.
Multilayer Ceramic Capacitor

As shown in FIG. 1, a multilayer ceramic capacitor 1 according to the first embodiment of the present invention includes a capacitor element body 10 having a configuration in which dielectric layers 2 and internal electrode layers 3 are alternately laminated. Both ends of the capacitor element body 10 are provided with a pair of external electrodes 4 respectively conductive to the internal electrode layers 3 alternately disposed inside the capacitor body 10. The capacitor element body 10 has any shape, but normally has a rectangular parallelepiped shape. The capacitor element body 10 has any size appropriately determined according to application, but normally has a size of about (0.6 to 5.6 mm)×(0.3 to 5.0 mm)×(0.3 to 1.9 mm).

The internal electrode layers 3 are laminated such that each of their end surfaces is alternately exposed on surfaces of the opposing two ends of the capacitor element body 10. The pair of external electrodes 4 is formed on both ends of the capacitor element body 10, and is connected to the exposed end surfaces of the alternately disposed internal electrode layers 3 to configure a capacitor circuit. Incidentally, a laminating direction is a direction in which the internal electrode layers 3 are alternately laminated.

Now, the multilayer ceramic capacitor 1 has a boundary surface where the most outwardly positioned internal electrode layer exists, and is divided into an interior part 20 and exterior parts 30A and 30B. The interior part 20 has the internal electrode layers 3 and interior part dielectric layers 2A. The exterior parts 30A and 30B have an exterior part dielectric layer 2B. Now, (d1+d2)/c≥0.14 is preferably satisfied, where "c" is a thickness in the laminating direction of the interior part 20, d1 is a thickness in the laminating direction of the exterior part 30A, and d2 is a thickness in the laminating direction of the exterior part 30B. More preferably, d1 is substantially equal to d2, but may not necessarily be equal thereto.

Dielectric Layer

The dielectric layer 2 is composed of a dielectric ceramic composition that contains at least barium titanate and a rare earth element.

The barium titanate is expressed by a composition formula of $Ba_mTiO_{2+m}$. "m" and a mole ratio of Ba and Ti are not limited, but barium titanate in which "m" satisfies 0.995≤m≤1.010, and the mole ratio of Ba and Ti satisfies 0.995≤Ba/Ti≤1.010 can be favorably used. Hereinafter, the composition formula of barium titanate will be simply described as $BaTiO_3$.

A kind of the rare earth element (R) is not limited. Yttrium (Y), dysprosium (Dy), and holmium (Ho) are favorably employed.

An amount of the rare earth element in the interior part dielectric layers 2A is not limited, but is preferably 1.0 mol part or more and is even more preferably 2.0 mol parts in terms of $R_2O_3$ with respect to 100 mol parts of barium titanate contained in the interior part dielectric layers 2A. Hereinafter, the amount of the rare earth element in the interior part dielectric layers 2A is assumed to be α mol part.

An amount of the rare earth element in the exterior part dielectric layer 2B is not limited, but is preferably 1.7 mol parts or more in terms of $R_2O_3$ with respect to 100 mol parts of barium titanate contained in the exterior part dielectric layer 2B. There is no upper limit for the amount of the rare earth element, but the upper limit therefor is preferably 3.0 mol parts or less, and is more preferably 2.5 mol parts or less. Hereinafter, the amount of the rare earth element in the exterior part dielectric layer 2B is assumed to be β mol part.

Now, the first embodiment is characterized in that a relationship between α and β is controlled within a specific range, and is specifically characterized in that β−α≥0.20 and α/β≤0.88 are satisfied. This range makes it possible to obtain a multilayer ceramic capacitor 1 with high high-temperature load lifetime. Such a multilayer ceramic capacitor 1 further has a small variation in high-temperature load lifetime and is highly reliable.

Incidentally, a method of measuring a composition of the dielectric layer 2 is not limited, but this measurement can be made by an X-ray diffractometer, for example. The amount α of the rare earth element in the interior part dielectric layer 2A can be calculated by setting a plurality of measurement points in the interior part 20, measuring an amount of the rare earth element at each of the points, and averaging each amount. The amount β of the rare earth element in the exterior part dielectric layer 2B can be calculated by setting a plurality of measurement points in the exterior part 30, measuring an amount of the rare earth element at each of the points, and averaging each amount. A method of setting the measurement points is not limited, and should be set such that α and β can be appropriately calculated.

The rare earth element has an effect on various kinds of characteristics such as high-temperature load lifetime and temperature characteristics, but relative permittivity may decrease when a large amount of the rare earth element is added. In the present embodiment, it is considered that various kinds of characteristics such as high-temperature load lifetime are greatly improved while reducing decrease in relative permittivity by containing a larger amount of the rare earth element in the exterior part than in the interior part.

The dielectric layer 2 can contain a variety of elements other than the rare earth element, and there is no limit therefor. For example, the dielectric layer 2 may contain magnesium, chromium, manganese, vanadium, calcium, and silicon, or may contain the other elements. Unlike the rare earth element, there is no need for the above-described elements to change their amount between in the interior part dielectric layer 2A and in the exterior part dielectric layer 2B.

Magnesium is contained preferably at 1.8 to 2.5 mol parts, and more preferably at 1.8 to 2.2 mol parts in terms of MgO with respect to 100 mol parts of barium titanate. Setting an amount of magnesium within the above-described range tends to have good relative permittivity in addition to good high-temperature load lifetime.

Chromium is contained preferably at 0.2 to 0.7 mol parts, and more preferably at 0.2 to 0.4 mol parts in terms of $Cr_2O_3$ with respect to 100 mol parts of barium titanate. Setting an amount of chromium within the above-described range tends to have good relative permittivity and electrostatic capacity temperature characteristics in addition to good high-temperature load lifetime. Incidentally, a similar effect is obtained even if manganese is contained instead of chromium.

Vanadium is contained preferably at 0.05 to 0.2 mol parts, and more preferably at 0.05 to 0.1 mol parts in terms of $V_2O_5$ with respect to 100 mol parts of barium titanate. Setting an amount of vanadium within the above-described range tends to have good relative permittivity and electrostatic capacity temperature characteristics in addition to good high-temperature load lifetime.

Calcium is contained preferably at 0.5 to 2.0 mol parts, and more preferably at 0.7 to 1.5 mol parts in terms of CaO with respect to 100 mol parts of barium titanate. Setting an amount of calcium within the above-described range tends to have good electrostatic capacity temperature characteristics in addition to good high-temperature load lifetime.

A silicon compound is contained preferably at 1.65 to 3.0 mol parts, and more preferably at 1.7 to 2.5 mol parts in terms of $SiO_2$ with respect to 100 mol parts of barium titanate. Setting an amount of the silicon compound within the above-described range tends to have good electrostatic capacity temperature characteristics and relative permittivity in addition to good high-temperature load lifetime.

Internal Electrode Layer 3

A conductive material contained in the internal electrode layer 3 is not limited, but a comparatively low-cost base metal can be employed, as a constituent material of the dielectric layer 2 is reduction resistant. Ni or an Ni alloy is preferable as the base metal employed as the conductive material. An alloy of Ni and one kind or more selected from Mn, Cr, Co, and Al is preferable as the Ni alloy, and an Ni amount in the alloy is preferably 95 wt % or more. Incidentally, about 0.1 wt % or less of various kinds of trace components, such as P, may be contained in the Ni or Ni alloy. A thickness of the internal electrode layer 3 should be appropriately determined according to application or so, but is preferably about 1 to 1.2 μm.

External Electrode 4

A conductive material contained in the external electrode 4 is not limited, but low-cost Ni, Cu, or an alloy of these can be employed in the present invention. A thickness of the external electrode 4 should be appropriately determined according to application or so, but is normally preferably about 10 to 50 μm.

Method of Manufacturing Multilayer Ceramic Capacitor 1

The multilayer ceramic capacitor 1 of the present embodiment is manufactured similarly to conventional multilayer ceramic capacitors by preparing a green chip with an ordinary printing method or sheet method using a paste, firing this, and then firing this after external electrodes are printed or transferred thereon. This manufacturing method will be described specifically below.

First, a dielectric raw material (mixed raw material powder) contained in a dielectric layer-dedicated paste is prepared, and this is made into a coating to prepare the dielectric layer-dedicated paste. Now, multiple kinds of dielectric layer-dedicated pastes whose amount of the rare earth element is changed are prepared. Two kinds of dielectric layer-dedicated pastes of a low rare earth dielectric layer-dedicated paste and a high rare earth dielectric layer-dedicated paste with a large amount of the rare earth element are normally prepared. The case where the above-described two kinds of dielectric layer-dedicated pastes are employed will be described below.

First, a raw material of barium titanate and raw materials containing various kinds of rare earth elements are prepared as dielectric raw materials. As these raw materials, oxides of the above-described compositions or mixtures and composite oxides thereof can be employed, but a mixture of various compounds appropriately selected from, for example, carbonates, oxalates, nitrates, hydroxides, organic metallic compounds and the like, which become the above-described oxides or composite oxides after firing, can be also employed.

It is possible to employ a barium titanate raw material manufactured by a variety of methods, such as liquid phase methods (e.g., oxalate method, hydrothermal method, alkoxide method, sol-gel method etc.), in addition to a so-called solid phase method.

A BET specific surface area value of the barium titanate raw material is preferably 2.0 to 5.0 $m^2/g$, and is more preferably 2.5 to 3.5 $m^2/g$.

A surface of a raw material powder of barium titanate may be coated with another raw material powder.

The amount of each compound in the dielectric raw material should be determined such that the composition of the above-described dielectric ceramic composite is obtained after firing. There is normally no change in composition of the dielectric ceramic composite between before and after firing. As described later, diffusion of the rare earth element may occur between the exterior part and the interior part due to firing. However, a diffusion amount of the rare earth element between the exterior part and the interior part is normally very small with respect to the amount of the rare earth element in the entire exterior part and the amount of the rare earth element in the entire interior part. Thus, α and β do not substantially change between before and after firing.

Apart from a barium titanate powder, a barium compound powder (e.g., a barium oxide powder, or a powder to be barium oxide by firing) may be added to the above-described dielectric raw material. There is no limit for an addition amount of the barium compound powder, and the barium compound powder may not be added. When adding the barium compound powder, for example, 0.20 to 1.50 mol parts in terms of barium oxide with respect to 100 mol parts of barium titanate may be added. Relative permittivity and electrostatic capacity temperature characteristics tend to be good by adding the barium compound.

Furthermore, raw material powders containing barium, calcium, and silicon may be individually prepared, or may be prepared in the form of a composite oxide (Ba, Ca) $SiO_3$ powder (BCG powder). Incidentally, there is no limit for the composition of (Ba, Ca) $SiO_3$, that is, a content ratio of Ba, Ca, and Si.

A grain diameter of the dielectric raw material is not limited, but is normally determined provided that d50 is 0.26 to 0.47 μm. Incidentally, d50 refers to a diameter of grain size at which an integrated value is 50%.

The dielectric layer-dedicated paste may be an organic-based coating made by kneading the dielectric raw material and an organic vehicle, or may be a water-based coating.

The organic vehicle is made by dissolving a binder in an organic solvent. The binder used for the organic vehicle is not limited, and should be appropriately selected from various ordinary binders such as ethyl cellulose and polyvinyl butyral. The organic solvent used is not limited either, and should be appropriately selected from various organic solvents, such as terpineol, butyl carbitol, aceton, and toluene, according to a method utilized, such as a printing method and sheet method.

When the dielectric layer-dedicated paste is configured as a water-based coating, the dielectric raw material and a water-based vehicle made by dissolving the likes of a water-soluble binder or dispersing agent in water are kneaded. The water-soluble binder employed in the water-based vehicle is not limited, and for example, polyvinyl alcohol, cellulose, a water-soluble acrylic resin and the like should be employed.

An internal electrode layer-dedicated paste is prepared by kneading the above-described organic vehicle and either a conductive material composed of the above-described various kinds of conductive metals and alloys or various kinds of oxides, organic metal compounds, resinates, and the like to be the above-described conductive material after firing. Further, a common material may be contained in the internal electrode layer-dedicated paste. The common material is not limited, but preferably has a composition similar to the main component.

An external electrode-dedicated paste is prepared similarly to the above-described internal electrode layer-dedicated paste.

The amount of the organic vehicle in each of the above-described pastes is not limited, and an ordinary amount (e.g., binder: about 1 to 5 wt %, solvent: about 10 to 50 wt %) is selected. If necessary, additives selected from various dispersing agents, plasticizing agents, dielectrics, insulators, and so on may be contained in each paste. The total amount of these additives is preferably 10 wt % or less.

When a printing method is employed, the dielectric layer-dedicated paste and the internal electrode layer-dedicated paste are printed on a substrate of PET or the like, laminated, and cut in a predetermined shape, after which the cut portions are peeled off from the substrate to obtain green chips.

When a sheet method is employed, a green sheet is formed using the dielectric layer-dedicated paste, the internal electrode layer-dedicated paste is printed and an internal electrode pattern is formed on this green sheet, after which these are laminated to obtain a green chip. At this time, the low rare earth dielectric layer-dedicated paste is mainly used for a portion to finally be the interior part dielectric layer. The high rare earth dielectric layer-dedicated paste is mainly used for a portion to finally be the exterior part dielectric layer.

The low rare earth dielectric layer-dedicated paste is preferably used entirely for the portion to be the interior part dielectric layer, but the high rare earth dielectric layer-dedicated paste may be partially used therefor.

The high rare earth dielectric layer-dedicated paste may be used entirely for the portion to be the exterior part dielectric layer, or the high rare earth dielectric layer-dedicated paste may be used partially therefor. For example, the high rare earth dielectric layer-dedicated paste may be used for a vicinity of the boundary surface between the exterior part and the interior part, the high rare earth dielectric layer-dedicated paste may be used near a center of the exterior part, or the high rare earth dielectric layer-dedicated paste may be used for a most outward portion of the exterior part.

Incidentally, when the low rare earth dielectric layer-dedicated paste is used entirely for the portion to be the interior part dielectric layer, the amount of the rare earth element contained in the low rare earth dielectric layer-dedicated paste can be usually approximated to post-firing $\alpha$. Similarly, when the high rare earth dielectric layer-dedicated paste is used entirely for the portion to be the exterior part dielectric layer, the amount of the rare earth element contained in the high rare earth dielectric layer-dedicated paste can be usually approximated to post-firing $\beta$.

During firing, the rare earth element diffuses from the dielectric layer containing a large amount of the rare earth element to the dielectric layer containing a small amount of the rare earth element. $\beta-\alpha \geq 0.20$ and $\alpha/\beta \leq 0.88$ can be obtained by mainly using the high rare earth dielectric layer-dedicated paste for the exterior part and mainly using the low rare earth dielectric layer-dedicated paste for the interior part. In this case, the rare earth element diffuses from the exterior part to the interior part, and the amount of the rare earth element of a portion (hereafter, also referred to as boundary vicinity part) that is within the interior part and that includes the interior part dielectric layer closest to the boundary surface between the interior part and the exterior part becomes higher than the amount of the rare earth element in the other portion within the interior part. High-temperature load lifetime in the multilayer ceramic capacitor of the present embodiment is considered to improve by increasing the amount of the rare earth element in an interior boundary vicinity part due to diffusion while lowering the amount of the rare earth element in the entire interior part.

Debinding treatment is performed on the green chip before firing. As debinding conditions, a temperature increase rate is preferably 5 to 300° C./hour, a holding temperature is preferably 180 to 400° C., and a temperature holding time is preferably 0.5 to 24 hours. A debinding atmosphere is air or a reducing atmosphere.

In firing of the green chip, a temperature increase rate is preferably 200 to 600° C./hour, and is more preferably 200 to 500° C./hour.

A holding temperature during firing is preferably 1200 to 1350° C. and is more preferably 1220 to 1300° C., and its holding time is preferably 0.5 to 8 hours and is more preferably 2 to 3 hours. When a holding temperature is 1200° C. or higher, the dielectric ceramic composite becomes easy to be sufficiently densified. When a holding temperature is 1350° C. or lower, it becomes easy to prevent a break of an electrode due to abnormal sintering of the internal electrode layer, deterioration of capacity temperature characteristics due to diffusion of an internal electrode layer constituent material, reduction of the dielectric ceramic composition, and the like.

A firing atmosphere is preferably a reducing atmosphere, and a humidified mixed gas of $N_2$ and $H_2$ can be employed as an atmospheric gas, for example.

An oxygen partial pressure during firing should be appropriately determined according to a kind of conductive material in the internal electrode layer-dedicated paste, but when a base metal of the likes of Ni or an Ni alloy is employed as the conductive material, an oxygen partial pressure in the firing atmosphere is preferably $10^{-14}$ to $10^{-10}$ MPa. When an oxygen partial pressure is $10^{-14}$ MPa or higher, it becomes easy to prevent the conductive material of the internal electrode layer from causing abnormal sintering, and it becomes easy to prevent the internal electrode layer from suffering a break. When an oxygen partial pressure is $10^{-10}$ MPa or lower, it becomes easy to prevent oxidation of the internal electrode layer. A temperature decrease rate is preferably 50 to 500° C./hour.

After undergoing firing in a reducing atmosphere, the capacitor element body preferably undergoes annealing. The annealing is a treatment for reoxidizing the dielectric layer, which can increase high-temperature load lifetime.

An oxygen partial pressure in an annealing atmosphere is preferably $10^{-9}$ to $10^{-5}$ MPa. When an oxygen partial pressure is $10^{-9}$ MPa or higher, it becomes easy to efficiently perform reoxidation of the dielectric layer. When an oxygen partial pressure is $10^{-5}$ MPa or lower, it becomes easy to prevent oxidation of the internal electrode layer.

A holding temperature during annealing is preferably 950 to 1150° C. When a holding temperature is 950° C. or higher, the dielectric layer becomes easy to be sufficiently oxidized, and insulation resistance (IR) and IR lifetime become easy to improve. On the other hand, when a holding temperature is 1150° C. or lower, it becomes easy to prevent oxidation of the internal electrode layer and a reaction between the internal electrode layer and a dielectric base. As a result, it becomes easy to improve electrostatic capacity, electrostatic capacity temperature characteristics, IR, and IR lifetime. Incidentally, the annealing may consist of only a temperature increase process and a temperature decrease process. That is, temperature holding time may be zero. In this case, holding temperature is identical to maximum temperature.

Regarding annealing conditions other than these, a temperature holding time is preferably 0 to 20 hours and is more preferably 2 to 4 hours, and a temperature decrease rate is preferably set to 50 to 500° C./hour and is more preferably set to 100 to 300° C./hour. For example, humidified $N_2$ gas or so is preferably employed as an atmospheric gas of the annealing.

For example, a wetter or so is used for humidifying $N_2$ gas or mixed gas or so in the above-described debinding treatment, firing, and annealing. In this case, a water temperature is preferably about 5 to 75° C.

The debinding treatment, firing, and annealing may be performed in succession, or may be performed independently.

The capacitor element body obtained as described above undergoes end surface polishing by barrel polishing, sand blasting, or the like, for example, is coated with the external electrode-dedicated paste and then fired to form the external electrode 4. If necessary, a covering layer is formed on the surface of an external electrode 4 by plating or so.

The multilayer ceramic capacitor of the present embodiment thus manufactured is mounted, for example, on a printed board by solder or so, and is used in various kinds of electronic apparatuses, and so on.

Second Embodiment

A second embodiment will be described below. Incidentally, matters not specifically described are similar to in the first embodiment.

In the second embodiment, the amount α of the rare earth element in the interior part dielectric layer 2A is 1.0 mol part or more, and is preferably 2.0 mol parts or more in terms of $R_2O_3$ with respect to 100 mol parts of barium titanate contained in the interior part dielectric layer 2A. Unlike the first embodiment, β−α and α/β are not limited, but β−α≥0.20 and α/β≤0.88 are preferably satisfied.

Figure 2:
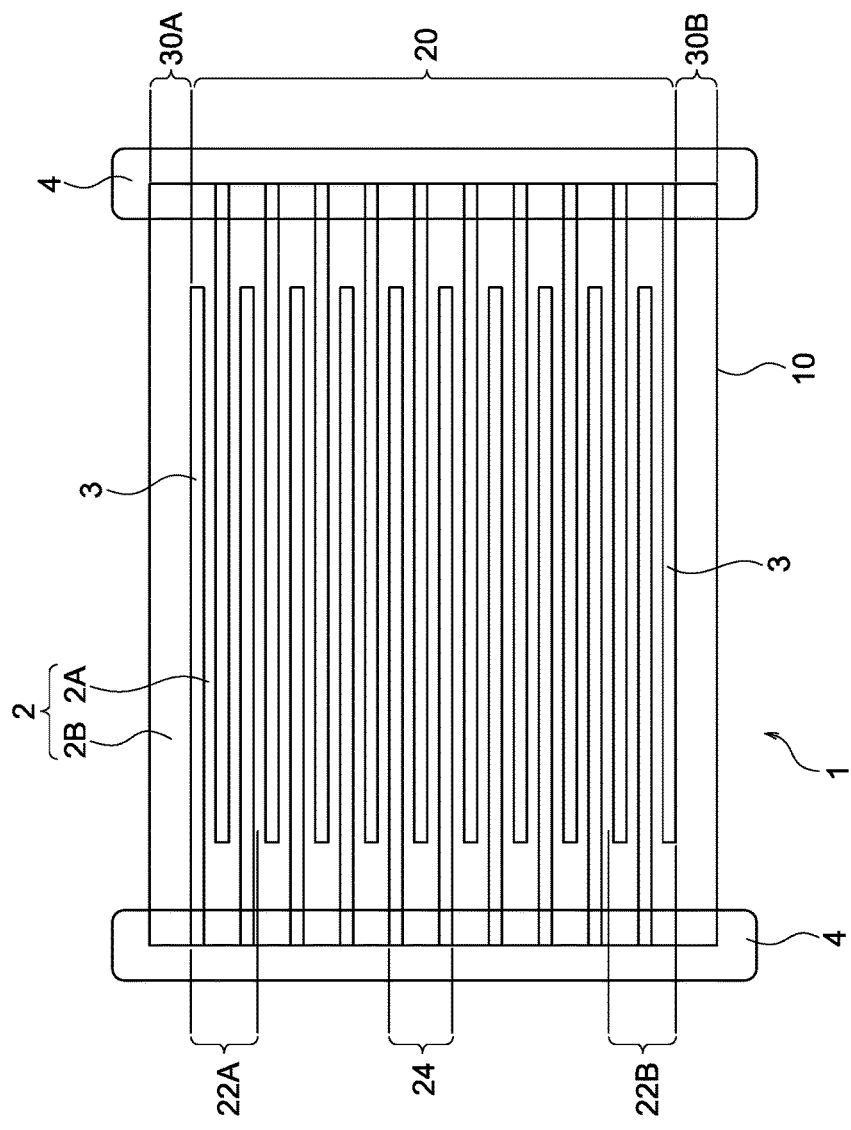
FIG. 2 is a cross-sectional view of a multilayer ceramic capacitor according to an embodiment of the present invention.

In the second embodiment, a relationship between an area ratio occupied by segregation of the rare earth element in boundary vicinity parts 22A and 22B shown in FIG. 2 and an area ratio occupied by segregation of the rare earth element in an interior central part 24 shown in FIG. 2 is important.

Now, the boundary vicinity parts 22A and 22B are portions that are contained in the interior part 20 and include the interior part dielectric layers whose distances from the boundary surfaces of the interior part 20 and exterior parts 30A and 30B are smallest. Preferably, the boundary vicinity parts 22A and 22B are portions that include 5 to 15 layers of the interior part dielectric layers 2A.

The interior central part 24 is in a central part in the laminating direction within the interior part 20, and is preferably a portion that includes 5 to 15 layers of the interior part dielectric layers 2A.

The second embodiment is characterized in that an area ratio occupied by segregation of the rare earth element in the boundary vicinity parts 22A and 22B is larger than an area ratio occupied by segregation of the rare earth element in the interior central part 24. This configuration improves high-temperature load lifetime. Incidentally, any rare earth element, such as yttrium, dysprosium, and holmium, may be employed.

Containing segregation of the rare earth element has an effect on various kinds of characteristics, such as high-temperature load lifetime and temperature characteristics. When a large amount of segregation of the rare earth element is contained, however, relative permittivity may decrease. In the present embodiment, segregating a large amount of the rare earth element in a portion close to the boundary surface of the interior part is considered to greatly improve various kinds of characteristics, such as high-temperature load lifetime, while reducing decrease in relative permittivity.

A method of calculating an area ratio occupied by segregation of the rare earth element will be described below.

Figure 3:
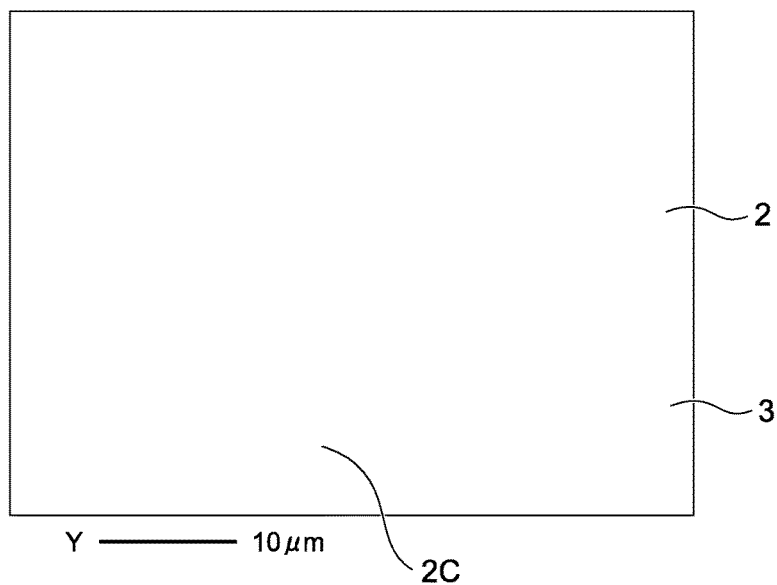
FIG. 3 is a schematic view of rare earth element mapping.

First, an element mapping image for the rare earth element is obtained by observing a cross section of the dielectric layer 2 with a scanning transmission electron microscope (STEM) and by setting a visual field whose size contains 10 layers of the interior part dielectric layers with an auxiliary energy dispersion type X-ray spectrometer. A schematic view of the element mapping image is shown in FIG. 3. Incidentally, the kind of rare earth element in this element mapping image is yttrium.

Then, the mapping image for the rare earth element obtained by the above-described method undergoes image processing to be divided into a region whose concentration of the rare earth element within the visual field is twice or larger than an average concentration thereof and a region whose concentration of the rare earth element within the visual field is smaller than twice an average concentration thereof. Then, the region whose concentration of the rare earth element within the visual field is twice or larger than an average concentration thereof is defined as a segregation region (portions such as 2C in FIG. 3).

Incidentally, an area of one segregation region is defined to be 0.01 μm² or larger. When an area of a region is smaller than 0.01 μm², this region is not regarded as the segregation region even if a concentration of the rare earth element in this region is twice or larger than an average concentration thereof.

Then, an area ratio of the segregation region with respect to the entire mapping image is measured. Then, measurement results in the boundary vicinity parts 22A and 22B and a measurement result in the interior central part 24 are compared.

In the second embodiment, high-temperature load lifetime improves when Sc<Ss is satisfied, where Sc is a segregation area in the interior central part 24, and Ss is a segregation areas in the boundary vicinity parts 22A and 22B. Sc/Ss≤0.9 is preferable, Sc/Ss≤0.8 is more preferable, and Sc/Ss≤0.5 is even more preferable. Incidentally, there is no preferable lower limit for a numerical value range of Sc/Ss.

The larger a difference between a rare earth amount in the exterior part dielectric layer 2B before firing and a rare earth amount in the interior part dielectric layer 2A before firing is, the larger a difference between Sc and Ss after firing becomes. This is because the larger the difference between the rare earth amount in the exterior part dielectric layer 2B before firing and the rare earth amount in the interior part dielectric layer 2A before firing is, the easier it is for the rare earth element to diffuse from the exterior parts 30A and 30B to the interior part 20, particularly to the boundary vicinity parts 22A and 22B, during firing.

A method of manufacturing the multilayer ceramic capacitor in the second embodiment differs from the method of manufacturing the multilayer ceramic capacitor in the first embodiment in the following points.

In the multilayer ceramic capacitor in the second embodiment, changing holding temperature during firing changes a diffusion amount of the rare earth element and Sc/Ss. Specifically, the higher holding temperature is, the larger Sc/Ss becomes and the more high-temperature load lifetime improves. That is, a preferable range of holding temperature during firing in the second embodiment is higher than the range of holding temperature during firing in the first embodiment. Specifically, 1300 to 1400° C. is preferable, and 1320 to 1350° C. is more preferable.

In order to deposit a large amount of segregation of the rare earth element in the boundary vicinity parts 22A and 22B, a BET specific surface area of the raw material of barium titanate in the exterior part dielectric layer is more preferably larger than that in the interior part dielectric layer when manufacturing the multilayer ceramic capacitor in the second embodiment, compared to when manufacturing the multilayer ceramic capacitor in the first embodiment. This makes it possible to further encourage diffusion of the rare earth element. For example, diffusion of the rare earth element can be further encouraged by satisfying $BET_{out}/BET_{in} \geq 1.16$, where $BET_{in}$ is a BET specific surface area of the raw material of barium titanate in the interior part dielectric layer, and $BET_{out}$ is a BET specific surface area of the raw material of barium titanate in the exterior part dielectric layer.

Incidentally, the present invention is not limited to the above-mentioned embodiments, and may be variously modified within the scope thereof.

For example, a multilayer ceramic capacitor was exemplified as the electronic component according to the present invention in the above-mentioned embodiments, but the electronic component according to the present invention is not limited to a multilayer ceramic capacitor. For example, a piezoelectric actuator, a ferroelectric memory, and so on, may be cited.

It is conceivable that a portion of the exterior part 30B may not be a dielectric layer but another type of layer, such as magnetic layer, in a case where the electronic component according to the present invention is a composite electronic component. That is, it is conceivable that the exterior part 30B does not exist and d2=0 is satisfied.

EXAMPLES

The present invention will be described below based on more detailed examples, but is not limited thereto.

Example 1

First, a barium titanate powder was prepared. A barium titanate powder expressed by a composition formula of $Ba_nTiO_{2+n}$ was employed, where "n" satisfies 0.995≤n≤1.010, and the mole ratio of Ba and Ti satisfies 0.995≤Ba/Ti≤1.010. A BET specific surface area of the barium titanate powder was 2.5 $m^2/g$. Hereafter, the composition formula of barium titanate will be described simply as $BaTiO_3$. Furthermore, a $Y_2O_3$ powder as an yttrium raw material, a $Dy_2O_3$ powder as a dysprosium raw material, an $Ho_2O_3$ powder as a holmium raw material, an $MgCO_3$ powder as a magnesium raw material, a $Cr_2O_3$ powder as a chromium raw material, and a $V_2O_5$ powder as a vanadium raw material were respectively prepared.

Next, a composite oxide (Ba, Ca) $SiO_3$ powder (BCG powder) was prepared. Specifically, a $BaCO_3$ powder, a $CaCO_3$ powder, and a $SiO_2$ powder were wet-blended by a ball mill and fired in air after drying, then wet-pulverized by a ball mill to produce the BCG powder.

Next, each of the prepared raw material powders was wet-blended and pulverized for 10 hours by a ball mill, and then dried to obtain a mixed raw material powder. A grain diameter of the raw material powder was assumed to be a material grain diameter, and d50 of the material grain diameter was configured to be 0.40 μm.

Next, 100 weight parts of the obtained mixed raw material powder, 10 weight parts of a polyvinyl butyral resin, 5 weight parts of dioctyl phthalate (DOP) as a plasticizing agent, and 100 weight parts of an alcohol as a solvent were blended by a ball mill to form a paste, thereby obtaining a dielectric layer-dedicated paste. Now, interior part dielectric layer-dedicated pastes and exterior part dielectric layer-dedicated pastes whose amounts of the rare earth element were changed as shown in Table 1 were obtained.

Incidentally, the dielectric layer-dedicated paste in the present example contains 100 mol parts of barium titanate in terms of $BaTiO_3$, 1.20 mol parts of a barium compound other than barium titanate in terms of BaO, 0.80 mol parts of calcium in terms of CaO, 2.00 mol parts of silicon in terms of $SiO_2$, 2.00 mol parts of magnesium in terms of MgO, 0.20 mol parts of chromium in terms of $Cr_2O_3$, and 0.10 mol parts of vanadium in terms of $V_2O_5$.

Apart from the above, 44.6 weight parts of Ni grains, 52 weight parts of terpineol, 3 weight parts of ethyl cellulose, and 0.4 weight parts of benzotriazole were kneaded by a triple roll milling machine to form a slurry, whereby an internal electrode layer-dedicated paste was prepared.

Then, a green sheet was formed on a PET film to have a thickness of 2 μm after being dried using the dielectric layer-dedicated paste produced as above. Next, an electrode layer was printed with a predetermined pattern on this green sheet using the electrode layer-dedicated paste, and then the sheet was peeled from the PET film, whereby a green sheet having the electrode layer was prepared. Next, a plurality of the green sheets having the electrode layers was laminated and pressure-bonded to be made into a green laminated body, and this green laminated body was cut into a predetermined size, whereby a green chip was obtained. At this time, the interior part dielectric layer-dedicated paste was used for a portion to be the interior part dielectric layer after firing, and the exterior part dielectric layer-dedicated paste was used for a portion to be the exterior part dielectric layer after firing.

Next, the obtained green chip underwent debinding treatment, firing, and annealing under the following conditions to obtain a multilayer ceramic fired body.

As debinding treatment conditions, temperature increase rate was 25° C./hour, holding temperature was 260° C., temperature holding time was 8 hours, and atmosphere was in the air.

As firing conditions, temperature increase rate was 300° C./hour, holding temperature was 1330° C., and holding time was 1 hour. Temperature decrease rate was 300° C./hour. Incidentally, atmospheric gas was a humidified $N_2+H_2$ mixed gas, and oxygen partial pressure was configured to be $10^{-12}$ MPa. It was confirmed that composition of the interior part dielectric layer in the interior central part and composition of the exterior part dielectric layer in the exterior part (vicinity of capacitor surface) had not substantially changed between before and after firing.

As annealing conditions, temperature increase rate was 200° C./hour, holding temperature was 1000° C., temperature holding time was 2 hours, temperature decrease rate was 200° C./hour, and atmospheric gas was humidified $N_2$ gas (oxygen partial pressure: $10^{-7}$ MPa).

A wetter was used to humidify the atmospheric gas during firing and annealing.

Next, an end surface of the obtained multilayer ceramic fired body was polished by sand blasting, then Cu was applied as an external electrode, and a sample of the multilayer ceramic capacitor shown in FIG. 1 was obtained. Size of the obtained capacitor sample was 3.2 mm×1.6 mm×1.6 mm Thickness "c" of the interior part was c=1400 μm. Thicknesses d1 and d2 of the exterior part were d1=d2=100 μm. Thickness of the interior part dielectric layer was 3.2 μm. Thickness of the internal electrode layer was 1.0 μm. The number of the interior part dielectric layers sandwiched by the internal electrode layers was to 300.

Measurement of high-temperature load lifetime HALT-η was performed for the obtained capacitor sample by the method indicated below.

The capacitor sample was held in an application state of a DC voltage under an electric field of 15 V/μm at 160° C., and a time from the beginning of application to the drop of insulation resistance by one order was defined as high-temperature load lifetime. In the present example, the above evaluation was performed for 10 capacitor samples, and an average value of the evaluations was defined as high-temperature load lifetime HALT-η. Results are shown in Table 1. Incidentally, in Table 1, a case where HALT-η was less than 50 hours was indicated by x, a case where HALT-η was 50 hours or more was indicated by Δ, a case where HALT-η was 100 hours or more was indicated by ○, and a case where HALT-η was 200 hours or more was indicated by ⊚. Moreover, a case where HALT-η was 50 hours or more was defined as being good.

TABLE 1

| Sample No. | Rare earth element | β (mol part) | α (mol part) | β − α (mol part) | α/β | ε | HALT-η (hr) | Determination |
|---|---|---|---|---|---|---|---|---|
| 1* | Y | 1.00 | 0.90 | 0.10 | 0.90 | 3060 | 37.9 | × |
| 2* | Y | 1.00 | 1.00 | 0.00 | 1.00 | 3035 | 3.5 | × |
| 3 | Y | 1.50 | 1.00 | 0.50 | 0.67 | 3097 | 100.3 | ○ |
| 4* | Y | 1.50 | 1.50 | 0.00 | 1.00 | 2949 | 9.6 | × |
| 5 | Y | 1.70 | 1.50 | 0.20 | 0.88 | 2990 | 120.6 | ○ |
| 6 | Y | 2.00 | 1.50 | 0.50 | 0.75 | 3020 | 159.7 | ○ |
| 7 | Y | 2.50 | 1.50 | 1.00 | 0.60 | 3052 | 222.1 | ⊚ |
| 8 | Y | 2.00 | 1.70 | 0.30 | 0.85 | 2982 | 128.3 | ○ |
| 9 | Dy | 2.00 | 1.00 | 1.00 | 0.50 | 3360 | 142.3 | ○ |
| 10 | Dy | 2.00 | 1.50 | 0.50 | 0.75 | 3188 | 246.2 | ⊚ |
| 11 | Ho | 2.00 | 1.50 | 0.50 | 0.75 | 3102 | 133.7 | ○ |

*Comparative Example

According to Table 1, HALT-η was 100 hours or more with respect to sample numbers 3 and 5 to 11, where β−α≥0.20 mol parts and α/β≤0.88 were satisfied. In contrast, HALT-η was less than 50 hours with respect to sample numbers 1, 2, and 4, where β−α<0.20 mol parts and α/β>0.88 were satisfied. That is, high-temperature load lifetime was significantly worse for sample numbers 1, 2, and 4, compared to for sample numbers 3 and 5 to 11.

Example 2

Samples whose thickness "c" of the interior part and thicknesses d1 and d2 of the exterior part were changed those of sample numbers 3 and 6 (sample numbers 3a to 3c and 6a to 6c) were prepared, and HALT-η was measured. Results are shown in Table 2.

TABLE 2

| Sample No. | Thickness of exterior part d1 = d2 (μm) | Thickness of interior part "c" (μm) | (d1 + d2)/c | ε | HALT-η (hr) | Determination |
|---|---|---|---|---|---|---|
| 3a | 80 | 1400 | 0.11 | 3069 | 57.0 | Δ |
| 3 | 100 | 1400 | 0.14 | 3097 | 100.3 | ○ |
| 3b | 120 | 1400 | 0.17 | 3110 | 123.1 | ○ |
| 3c | 120 | 1200 | 0.20 | 3119 | 138.7 | ○ |
| 6a | 80 | 1400 | 0.11 | 2986 | 83.1 | Δ |
| 6 | 100 | 1400 | 0.14 | 3020 | 159.7 | ○ |
| 6b | 120 | 1400 | 0.17 | 3058 | 201.8 | ⊚ |
| 6c | 120 | 1200 | 0.20 | 3106 | 280.4 | ⊚ |

Table 2 shows that the higher (d1+d2)/c is, the more HALT-η excels.

Example 3

Sample numbers 4d to 4f and 6d to 6f were prepared by changing firing temperature of sample numbers 4 and 6 between 1250° C. and 1350° C.

Y segregation areas of the interior central part and the boundary vicinity part were measured with respect to sample numbers 4 and 4d to 4f and sample numbers 6 and 6d to 6f. A method of measuring Y segregation area is indicated below.

SEM observation was performed on the interior central part and the boundary vicinity part of a cut section of the dielectric layer of the capacitor sample. Visual field was 50 μm×50 μm at a magnification of 2000 times, and this visual field was configured to include 10 layers of the interior part dielectric layers. Then, an element mapping of Y element was performed using a wavelength dispersion type X-ray spectrometer (WDS) auxiliary to the SEM, and an element mapping image of Y element was created.

Then, the above-described Y element mapping image was image processed to be divided into a region whose concentration of Y element within the visual field was twice or larger than an average concentration thereof and a region whose concentration of Y element within the visual field was smaller than twice an average concentration thereof. The region whose concentration was twice or larger than the average concentration was defined as a Y segregation region, and an area ratio of the Y segregation region with respect to the entire area of the observation visual field was calculated. Results are shown in Table 3.

TABLE 3

| | | | | | Y segregation area (%) | | | | | |
|---|---|---|---|---|---|---|---|---|---|---|
| Sample No. | Firing temperature (° C.) | β (mol part) | α (mol part) | β − α (mol part) | Interior central part $S_C$ | Boundary vicinity part $S_S$ | Area ratio of Y segregation $S_C/S_S$ | ε | HALT-η (hr) | Determination |
| 4d* | 1250 | 1.50 | 1.50 | 0.00 | 0.65 | 0.64 | 1.02 | 2651 | 6.2 | × |
| 4e* | 1300 | 1.50 | 1.50 | 0.00 | 0.66 | 0.66 | 1.00 | 2903 | 12.0 | × |
| 4* | 1330 | 1.50 | 1.50 | 0.00 | 0.64 | 0.64 | 1.00 | 2949 | 9.6 | × |
| 4f* | 1350 | 1.50 | 1.50 | 0.00 | 0.64 | 0.63 | 1.02 | 2859 | 23.4 | × |
| 6d | 1250 | 2.00 | 1.50 | 0.50 | 0.65 | 0.67 | 0.97 | 2721 | 72.3 | Δ |
| 6e | 1300 | 2.00 | 1.50 | 0.50 | 0.61 | 0.75 | 0.81 | 2971 | 118.6 | ○ |
| 6 | 1330 | 2.00 | 1.50 | 0.50 | 0.63 | 0.98 | 0.64 | 3020 | 159.7 | ○ |
| 6f | 1350 | 2.00 | 1.50 | 0.50 | 0.64 | 1.42 | 0.45 | 2936 | 228.1 | ⊚ |

*Comparative Example

According to Table 3, when the amount of the rare earth element contained in the exterior part dielectric layer and the amount of the rare earth element contained in the interior part dielectric layer are substantially identical to each other (sample numbers 4 and 4d to 4f), a difference between Y segregation area Sc in the interior central part and Y segregation area Ss in the boundary vicinity part becomes extremely small regardless of the firing temperature. HALT-η becomes small regardless of the firing temperature.

In contrast, when the amount of the rare earth element contained in the exterior part dielectric layer and the amount of the rare earth element contained in the interior part dielectric layer are different (sample numbers 6 and 6d to 6f), the Y segregation area Ss in the boundary vicinity part particularly changes by the firing temperature. The smaller a ratio of the Y segregation area Sc in the interior central part with respect to the Y segregation area Ss in the boundary vicinity part is, the larger HALT-η becomes.

NUMERICAL REFERENCES

1 . . . multilayer ceramic capacitor
2 . . . dielectric layer
   2A . . . interior part dielectric layer
   2B . . . exterior part dielectric layer
3 . . . internal electrode layer
4 . . . external electrode
10 . . . capacitor element body
20 . . . interior part
   22A, 22B . . . boundary vicinity part
   24 . . . interior central part
30A, 30B . . . exterior part

The invention claimed is:

1. A ceramic electronic component comprising an interior part and an exterior part, wherein
   the interior part includes an interior part dielectric layer and an internal electrode layer,
   the exterior part includes an exterior part dielectric layer,
   the exterior part is positioned outside the interior part along a laminating direction thereof,
   the interior part dielectric layer and the exterior part dielectric layer respectively contain barium titanate as a main component, and
   $\beta - \alpha \geq 0.20$ and $\alpha/\beta \leq 0.88$ are satisfied, where
   $\alpha$ mol part is an amount of a rare earth element contained in the interior part dielectric layer, provided that an amount of barium titanate contained in the interior part dielectric layer is 100 mol parts in terms of $BaTiO_3$ and
   $\beta$ mol part is an amount of a rare earth element contained in the exterior part dielectric layer, provided that an amount of barium titanate contained in the exterior part dielectric layer is 100 mol parts in terms of $BaTiO_3$.

2. The ceramic electronic component according to claim 1, wherein $\alpha \geq 1.0$ and $\beta \geq 1.7$ are satisfied.

3. The ceramic electronic component according to claim 1, wherein
   $(d1+d2)/c \geq 0.14$ is satisfied, where "c" is a thickness of the interior part, and d1 and d2 are respectively a thickness of the two exterior parts.

4. The ceramic electronic component according to claim 2, wherein
   $(d1+d2)/c \geq 0.14$ is satisfied, where "c" is a thickness of the interior part, and d1 and d2 are respectively a thickness of the two exterior parts.

* * * * *